United States Patent
Zhang et al.

(10) Patent No.: US 12,249,260 B2
(45) Date of Patent: Mar. 11, 2025

(54) FLEXIBLE POLARIZER AND FLEXIBLE TOUCH DISPLAY DEVICE

(71) Applicant: BOE Technology Group Co., Ltd., Beijing (CN)

(72) Inventors: Xiongnan Zhang, Beijing (CN); Paoming Tsai, Beijing (CN); Yongxiang Shi, Beijing (CN); Ce Xu, Beijing (CN); Yunjin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 253 days.

(21) Appl. No.: 17/914,563

(22) PCT Filed: Aug. 11, 2021

(86) PCT No.: PCT/CN2021/111921
§ 371 (c)(1),
(2) Date: Sep. 26, 2022

(87) PCT Pub. No.: WO2022/068412
PCT Pub. Date: Apr. 7, 2022

(65) Prior Publication Data
US 2023/0162627 A1    May 25, 2023

(30) Foreign Application Priority Data
Sep. 29, 2020 (CN) .......................... 202011047316.8

(51) Int. Cl.
*G06F 9/30* (2018.01)
*G02B 5/30* (2006.01)
(Continued)

(52) U.S. Cl.
CPC ........... *G09F 9/301* (2013.01); *G02B 5/3083* (2013.01); *G06F 3/0412* (2013.01)

(58) Field of Classification Search
CPC ....... G06F 3/0412; G06F 3/0443–0446; G09F 9/301; G02B 1/14; G02B 5/305;
(Continued)

(56) References Cited

U.S. PATENT DOCUMENTS

2013/0044282 A1* 2/2013 Kuwabara ............... B32B 17/08
                                                       313/504
2018/0047945 A1* 2/2018 Hack .................. H10K 59/8793
(Continued)

FOREIGN PATENT DOCUMENTS

CN        1971355 A      5/2007
CN     106199812 A     12/2016
(Continued)

OTHER PUBLICATIONS

International Search Report issued Oct. 26, 2021 in corresponding International Patent Application No. PCT/CN2021/111921 (with English translation), 4 pages.

(Continued)

*Primary Examiner* — Tuan T Dinh
(74) *Attorney, Agent, or Firm* — XSENSUS LLP

(57) ABSTRACT

A flexible polarizer and a flexible touch display device. The flexible polarizer includes: a support protective layer; a linear polarized layer provided on the side of the support protection layer and comprising an acidic substance; a retardation layer provided on the side of the linear polarized layer distant from the support protection layer, and bonded to the linear polarized layer by means of a first bonding layer; and a block layer provided on the side of the retardation layer distant from the linear polarized layer. The block layer is bonded to a flexible touch display panel of the flexible touch display device by means of the second bonding layer. The block layer is used for blocking the acidic (Continued)

substance in the linear polarized layer from permeating into the flexible touch display panel.

20 Claims, 3 Drawing Sheets

(51) Int. Cl.
  *G06F 3/041* (2006.01)
  *G09F 9/30* (2006.01)
(58) Field of Classification Search
  CPC ........ G02B 5/3083; G02B 5/30; H10K 59/12; H10K 59/40
  USPC .................. 361/749–750, 814; 349/149–151
  See application file for complete search history.

(56) References Cited

U.S. PATENT DOCUMENTS

| | | | |
|---|---|---|---|
| 2019/0211234 A1* | 7/2019 | Yamasaki | H10K 50/11 |
| 2019/0346591 A1* | 11/2019 | Thothadri | H05K 5/03 |
| 2020/0057178 A1* | 2/2020 | Thothadri | H10K 50/844 |
| 2020/0251025 A1* | 8/2020 | Li | H10K 59/873 |
| 2021/0407341 A1* | 12/2021 | Shi | H10K 59/8791 |

FOREIGN PATENT DOCUMENTS

| | | | |
|---|---|---|---|
| CN | 106646713 A | 5/2017 | |
| CN | 107179623 A | 9/2017 | |
| CN | 107741613 A | 2/2018 | |
| CN | 108054193 A | 5/2018 | |
| CN | 109065579 A | 12/2018 | |
| CN | 110109277 A | 8/2019 | |
| CN | 110192131 A | 8/2019 | |
| CN | 209327997 U | 8/2019 | |
| CN | 110325887 A | 10/2019 | |
| CN | 210723033 U | 6/2020 | |
| CN | 112068735 A | 12/2020 | |
| CN | 109065579 B | 3/2021 | |
| CN | 212809177 U | 3/2021 | |
| JP | 2005-227692 A | 8/2005 | |
| JP | 2018141962 A | 9/2018 | |
| JP | 2018159911 A | 10/2018 | |
| KR | 20190004008 A | 1/2019 | |
| KR | 20190107710 A | 9/2019 | |
| KR | 20190125990 A | 11/2019 | |
| TW | 201833602 A | 9/2018 | |
| TW | 201841758 A | 12/2018 | |
| WO | 2018139358 A1 | 8/2018 | |
| WO | 2018159277 A1 | 9/2018 | |

OTHER PUBLICATIONS

Written Opinion issued Oct. 26, 2021 in corresponding International Patent Application No. PCT/CN2021/111921 (with English translation), 4 pages.

Office Action issued on Nov. 14, 2024, in corresponding Chinese patent Application No. 202011047316.8, 18 pages.

* cited by examiner

FLEXIBLE POLARIZER AND FLEXIBLE TOUCH DISPLAY DEVICE

CROSS REFERENCE

The present disclosure is a U.S. national phase application of International Application No. PCT/CN2021/111921 filed on Aug. 11, 2021, which claims priority to Chinese Patent Application No. 202011047316.8, filed on Sep. 29, 2020 and entitled "FLEXIBLE POLARIZER AND FLEXIBLE TOUCH DISPLAY DEVICE", and the entire content thereof is incorporated herein by reference.

TECHNICAL FIELD

The present disclosure relates to the field of display technology, and in particular, to a flexible polarizer and a flexible touch display device.

BACKGROUND

From current market trends, an OLED (Organic Light-emitting Diode) touch display panel has become, due to good flexibility thereof, a favored object of electronic devices such as mobile phones and tablet computers.

Reflectivity of the OLED touch display panel to external ambient light is relatively high due to structural characteristics of OLED devices. In order to reduce overall reflectivity of the OLED touch display panel, a polarizer is usually used between a cover plate and the OLED touch display panel. However, in a reliability test, it was found that the use of the polarizer would corrode metal lines in a touch function layer in the OLED touch display panel, which is likely to cause the touch function failure.

It should be noted that information disclosed in above section is only for enhancement of understanding of the background of the present disclosure, and therefore may contain information that does not form the prior art already known to a person of ordinary skill in the art.

SUMMARY

The purpose of the present disclosure is to provide a flexible polarizer and a flexible touch display device.

In one aspect of the present disclosure, there is provided a flexible polarizer, applied in a flexible touch display device, including:
  a support protection layer;
  a linear polarized layer arranged on a side of the support protection layer, wherein the linear polarized layer includes an acidic substance;
  a retardation layer arranged on a side of the linear polarized layer away from the support protection layer, and is bonded to the linear polarized layer through a first bonding layer; and
  a block layer arranged on aside of the retardation layer away from the linear polarized layer, wherein a second bonding layer is provided on a side of the block layer away from the retardation layer, and the block layer is bonded to a flexible touch display panel in the flexible touch display device through the second bonding layer;
  wherein the block layer is configured to block the acidic substance in the linear polarized layer from penetrating into the flexible touch display panel.

In some exemplary embodiments of the present disclosure, the linear polarized layer is an iodine-based polarized layer, and the acidic substance includes iodine element.

In some exemplary embodiments of the present disclosure, a material of the block layer includes polymethyl methacrylate or cycloolefin polymer.

In some exemplary embodiments of the present disclosure, a thickness of the block layer ranges from 0.5 μm to 2 μm.

In some exemplary embodiments of the present disclosure, light transmittance of the block layer is greater than 90%.

In some exemplary embodiments of the present disclosure, a thickness of the linear polarized layer ranges from 1 μm to 15 μm.

In some exemplary embodiments of the present disclosure, a material of the support protection layer includes polymethyl methacrylate, and a thickness of the support protection layer ranges from 10 μm to 50 μm.

In some exemplary embodiments of the present disclosure, materials of the first bonding layer and the second bonding layer include polymethyl methacrylate, and thicknesses of the first bonding layer and the second bonding layer range from 0.1 μm to 3 μm.

In some exemplary embodiments of the present disclosure, the retardation layer is 0.1 μm to 5 μm.

In some exemplary embodiments of the present disclosure, elastic modulus of the flexible polarizer ranges from 1 GPa to 10 GPa.

In another aspect of the present disclosure, there is provided a flexible touch display device, including:
  a flexible touch display panel including a touch function layer and a display panel arranged on a side of the touch function layer; and
  the flexible polarizer according to any of claims 1 to 10, wherein the flexible polarizer is arranged on a side of the touch function layer away from the display panel, and the flexible polarizer is bonded to the touch function layer through the second bonding layer.

In some exemplary embodiments of the present disclosure, the touch function layer includes:
  a buffer layer formed on the display panel:
  a first metal pattern layer formed on a side of the buffer layer away from the display panel, wherein the first metal pattern layer includes a plurality of first conductive bridges disconnected from each other;
  an insulating layer covering the first metal pattern layer, wherein the insulating layer is provided with a plurality of hollowed-out holes, and the hollowed-out holes expose part of the first conductive bridge;
  a second metal pattern layer formed on a side of the insulating layer away from the buffer layer, wherein the second metal pattern layer includes a first touch electrode and a second touch electrode that are arranged in the same layer and are insulated from each other, and wherein a plurality of first touch electrodes are provided, and adjacent first touch electrodes are electrically connected to the same first conductive bridge via the hollowed-out holes, respectively; a plurality of second touch electrodes are provided, and adjacent second touch electrodes are electrically connected through a second conductive bridge; and the second conductive bridge is arranged in the same layer as the first touch electrode and the second touch electrode; and
  a protection layer covering the second metal pattern layer, wherein a side of the protection layer away from the second metal layer is bonded to the block layer through the second bonding layer.

In some exemplary embodiments of the present disclosure, orthographic projections of the first touch electrode and the second touch electrode on the buffer layer are both mesh-shaped.

In some exemplary embodiments of the present disclosure, the display panel includes:

a base layer;

a driving circuit layer formed on the base layer;

an organic light-emitting display layer formed on a side of the driving circuit layer away from the base layer; and a thin film encapsulation layer formed on a side of the organic light-emitting display layer away from the base layer, wherein the touch function layer is formed on a side of the thin film encapsulation layer away from the organic light-emitting display layer.

In some exemplary embodiments of the present disclosure, the flexible touch display device further includes a cover plate, a third bonding layer and a back film;

wherein the cover plate is bonded to a side of the flexible polarizer away from the touch function layer through the third bonding layer; and the back film is arranged on a side of the display panel away from the touch function layer.

It should be understood that the foregoing general description and the following detailed description are exemplary and explanatory only and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

DETAILED DESCRIPTION

Figure 1:
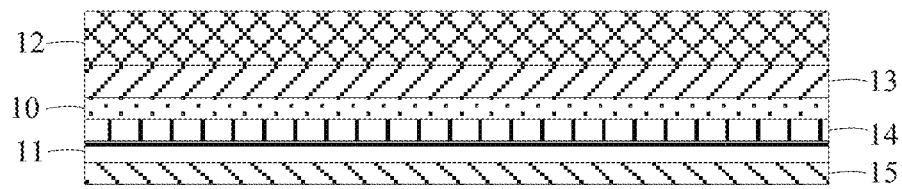
FIG. 1 illustrates a schematic structural diagram of a flexible polarizer according to an embodiment of the present disclosure.

Technical solutions of the present disclosure will be specifically described below further through embodiments and in conjunction with the drawings. In the specification, the same or similar reference numerals refer to the same or similar parts. Following descriptions of embodiments of the present disclosure with reference to the drawings are intended to explain a general concept of the present disclosure, and should not be construed as a limitation of the present disclosure.

Furthermore, in the following detailed descriptions, for convenience of explanation, numerous specific details are set forth in order to provide a thorough understanding of embodiments of the present disclosure. However, it is apparent that one or more embodiments may be practiced without these specific details.

It should be noted that, expressions such as "on", "formed on" and "arranged on" described herein may mean that one layer is directly formed or arranged on another layer, or may mean that a layer is indirectly formed or arranged on another layer, that is, there are other layers between the two layers.

Terms such as "a" and "the" are used to indicate presence of one or more elements/components/etc. Terms such as "include" and "comprise" are used to indicate an open-ended inclusion and refer to presence of additional elements/components/etc., in addition to listed elements/components/etc.

In the present disclosure, unless otherwise indicated, an expression "arranged in the same layer" means that two layers, parts, components, elements or sections may be formed through the same patterning process, and that the two layers, parts, components, elements or sections are generally formed of the same material.

In the present disclosure, unless otherwise indicated, an expression "patterning process" generally includes steps of photoresist coating, exposure, development, etching, and photoresist stripping. An expression "one-shot patterning process" means a process of forming a patterned layer, feature, member, etc., using one mask.

Embodiments of the present disclosure provide a flexible polarizer, which can be folded or bent. The flexible polarizer can be applied to a flexible touch display device, for example, an OLED flexible touch display device. The flexible touch display device can be folded or bent as a whole.

As shown in FIG. 1, a flexible polarizer 1 according to embodiments of the present disclosure may at least include a linear polarized layer 10 and a block layer 11. The linear polarized layer 10 may include an acidic substance. The acidic substance refers to a substance that becomes acidic in contact with water. The block layer 11 may be arranged on a side of the linear polarized layer 10, and a side of the block layer 11 away from the linear polarized layer 10 can be attached to a flexible touch display panel 2 in a flexible touch display device. The block layer 11 is used for blocking the acidic substance in the linear polarized layer 10 from penetrating into the flexible touch display panel 2, so as to prevent metal lines in a touch function layer 20 in the flexible touch display panel 2 from being corroded.

For example, the linear polarizer layer 10 according to embodiments of the present disclosure may be an iodine-based polarizer layer. That is, the entire flexible polarizer 1 may be an iodine-based flexible polarizer. The iodine-based polarizer can be obtained by dyeing with iodine dye, and has a polarization property due to optical dichroism of crystal contained. Iodine element exists in the polarizer layer in the form of iodine ions after dyeing. The iodine ions are acidic. That is, the acidic substance mentioned before may include the iodine element.

It should be noted that a method for manufacturing the linear polarized layer 10 may include following steps. A PVA (polyvinyl alcohol) film is immersed in iodine ion solution, so that the iodide ions are diffused into the PVA film. The PVA film is stretched after slight heating, so that the PVA film becomes long, and also becomes narrow and thin. PVA molecules are originally distributed irregularly at any angle, and after being stretched by force, the molecules gradually and uniformly deflect in a direction of the force exerted. The dichroic iodine molecules attached to the PVA also follow the direction and have directionality. As a result, the linear polarized layer 10 with polarizing effect is produced.

In some embodiments of the present disclosure, a thickness of the linear polarized layer 10 may range from 1 μm to 15 μm, for example, 1 μm, 3 μm, 5 μm, 7 μm, 9 μm, 11 μm, 13 μm, 15 μm, etc., but not limited to this. The thickness of the linear polarized layer 10 may also be within other ranges, such as less than 1 μm or greater than 15 μm, etc., depending on specific situations.

In some embodiments of the present disclosure, when the iodine-based flexible polarizer mentioned before is attached to the flexible touch display panel 2, materials such as polymethyl methacrylate (acrylic) or cycloolefin polymer can be used for manufacturing the block layer 11. That is, a material of the block layer 11 may include polymethyl methacrylate or cycloolefin polymer. Such design enables low hygroscopicity (referring to ability of the material to absorb moisture under a certain temperature and humidity) and good air tightness of the block layer 11, so as to effectively prevent iodide ions in the linear polarized layer 10 from penetrating into the touch function layer 20 of the flexible touch display panel 2, thereby improving corrosion of metal lines in the touch function layer 20, so as to improve product reliability.

The polymethyl methacrylate or cycloolefin polymer is used to manufacture the block layer 11, which also enables high light transmittance of the block layer 11. For example, the light transmittance of the block layer 11 can be greater than 90%. As a result, overall transmittance and degree of polarization of the flexible polarizer 1 would not be affected, which also enables good flexibility of the block layer 11. For example, elastic modulus of the block layer 11 can be less than 1 GPa, so that the flexible polarizer 1 produced can be applied in a flexible display product.

For example, a thickness of the block layer 11 according to embodiments of the present disclosure may range from about 0.5 μm to 2 μm, for example, 0.5 μm, 1 μm, 1.5 μm, 2 μm, etc., to prevent the iodide ions in the linear polarized layer 10 from permeating into the flexible touch display panel 2, which also further improves the flexibility of the flexible polarizer 1.

It should be noted that when the flexible polarizer 1 according to embodiments of the present disclosure is applied to an OLED display product, in order to better reduce the reflectivity of the OLED display product to external ambient light, the flexible polarizer 1 according to embodiments of the present disclosure can be a circular flexible polarizer. That is, the flexible polarizer 1 according to embodiments of the present disclosure may also include a retardation layer 14 and a first bonding layer 13, in addition to the linear polarizer layer 10 and the block layer 11 mentioned before, as shown in FIG. 1. The retardation layer 14 is located between the linear polarized layer 10 and the block layer 11, and is bonded to the linear polarized layer 10 through the first bonding layer 13. The block layer 11 may be directly formed on, by means of coating, a side of the retardation layer 14 away from the linear polarized layer 10, but not limited to this.

In some embodiments of the present disclosure, a thickness of the retardation layer 14 may range from 0.1 μm to 5 μm, for example, 0.1 μm, 1 μm, 2 μm, 3 μm, 4 μm, 5 μm, etc., but not limited to this. The thickness of the retardation layer 14 may also be within other ranges, such as less than 0.1 μm or greater than 5 μm, etc., depending on specific situations. A thickness of the first bonding layer 13 may range from 0.1 μm to 3 μm, for example, 0.1 μm, 1 μm, 2 μm, 3 μm, etc., but not limited to this. The thickness of the first bonding layer 13 may also be within other ranges, such as less than 0.1 μm or greater than 3 μm, etc., depending on specific situations.

In some embodiments, a material of the first bonding layer 13 may include polymethyl methacrylate. That is, the first bonding layer 13 may be acrylic glue, so as to ensure bonding stability between the retardation layer 14 and the linear polarized layer 10, and also to effectively prevent the iodide ions in the linear polarized layer 10 from penetrating into the touch function layer 20 of the flexible touch display panel 2, but not limited to this. The material of the first bonding layer 13 may also be other materials.

It should be understood that, as shown in FIG. 1, the flexible polarizer 1 according to embodiments of the present disclosure may further include a support protection layer 12. The support protection layer 12 may be located on a side of the linear polarizer layer 10 away from the block layer 11, so as to protect the linear polarizer layer 10 and to improve flatness of the entire flexible polarizer 1, thereby ensuring the bonding effect between the flexible polarizer 1 and the cover plate 3. For example, a material of the support protection layer 12 may include polymethyl methacrylate. That is, the support protection layer 12 may be an acrylic sheet, which not only has waterproof function, but also has good flexibility. Such design can further ensure good flexibility of the entire flexible polarizer 1, so that the flexible polarizer 1 is easy to be bent.

It should be noted that, the material of the support protection layer 12 is not limited to polymethyl methacrylate, and may also be other materials, depending on specific situations.

In some embodiments, a thickness of the support protection layer 12 according to embodiments of the present disclosure may range from 10 μm to 50 μm, for example, 10 μm, 20 μm, 30 μm, 40 μm, 50 μm, etc., so as to ensure good support performance of the support protection layer 12, and also to ensure bending performance of the support protection layer 12.

In some embodiments of the present disclosure, as shown in FIG. 1, the flexible polarizer 1 may further include a second bonding layer 15. The second bonding layer 15 may be bonded to a side of the block layer 11 away from the retardation layer 14, and the block layer 11 may be bonded to a touch display surface through the second bonding layer 15.

In some embodiments, a material of the second bonding layer 15 may include polymethyl methacrylate. That is, the second bonding layer 15 may be acrylic glue, so as to ensure bonding stability between the block layer 11 and the flexible touch display panel 2, and also to effectively prevent the iodide ions in the linear polarized layer 10 from penetrating into the touch function layer 20 of the flexible touch display panel 2, but not limited to this. The material of the second bonding layer 15 may also be other materials. A thickness of the second bonding layer 15 may range from 0.1 μm to 3 μm, for example, 0.1 μm, 1 μm, 2 μm, 3 μm, etc., but not limited to this. The thickness of the second bonding layer 15 may also be within other ranges, such as less than 0.1 μm or greater than 3 μm, etc., depending on specific situations.

It should be noted that, before the flexible polarizer 1 is attached to the flexible touch display panel 2, the flexible polarizer 1 may further include a release film (not shown in the figure). The release film is attached to a side of the second bonding layer 15 away from the block layer 11, to protect the entire flexible polarizer 1. When the flexible polarizer 1 is to be attached to the flexible touch display panel 2, it is only necessary to tear off the release film to expose the second bonding layers 15, and then to attach the second bonding layer 15 to the flexible touch display panel 2.

According to embodiments of the present disclosure, the support protection layer 12, the first bonding layer 13 and the second bonding layer 15 may be all acrylic structures, so as to ensure good flexibility of the flexible polarizer 1 as a whole, and also to enable more effective protection to the linear polarized layer 10, thereby improving the product quality of the flexible polarizer 1.

In some embodiments of the present disclosure, elastic modulus of the entire flexible polarizer 1 may range from 1 GPa to 10 GPa, for example, 1 GPa, 4 GPa, 7 GPa, 10 Gpa, etc., but not limited to this. The elastic modulus of the entire flexible polarizer 1 may also be within other ranges, such as less than 1 GPa or greater than 10 Gpa, etc., which can be determined according to specific actual needs.

Figure 2:
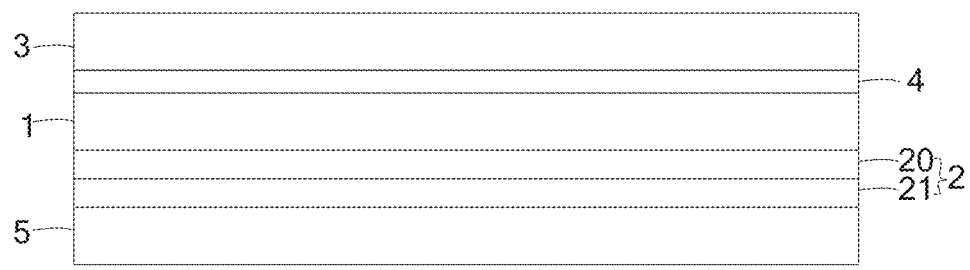
FIG. 2 illustrates a schematic structural diagram of a flexible touch display device according to an embodiment of the present disclosure.
Figure 3:
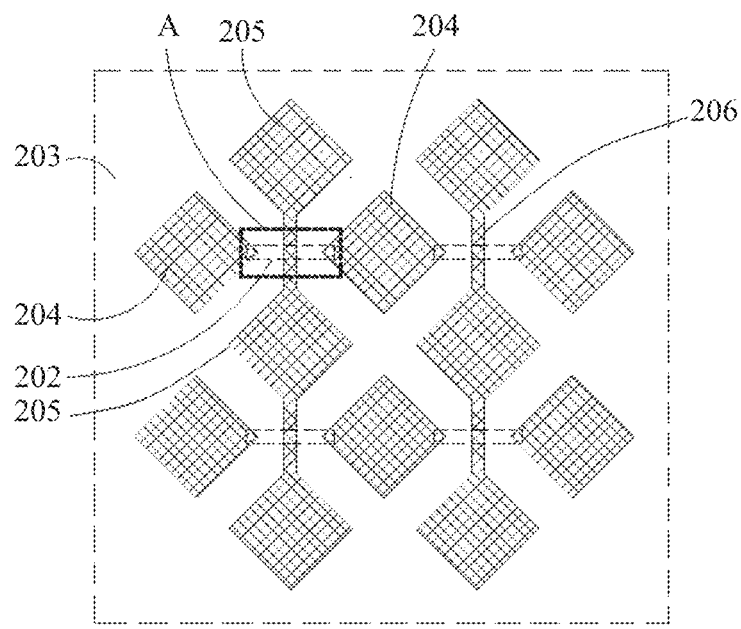
FIG. 3 is a schematic diagram illustrating a partial structure of a touch function layer of a flexible touch display panel in a flexible touch display device according to an embodiment of the present disclosure.
Figure 4:
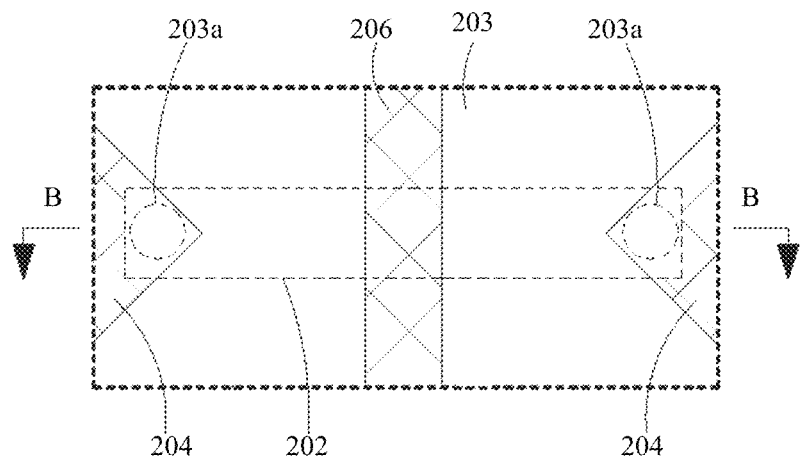
FIG. 4 illustrates an enlarged schematic structural diagram of part A in the touch function layer shown in FIG. 3.
Figure 5:
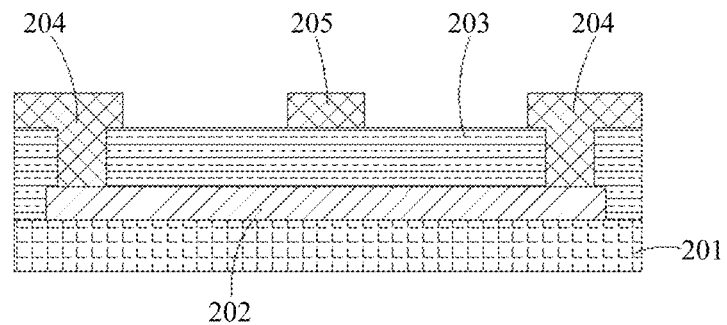
FIG. 5 illustrates a schematic cross-sectional view of the touch function layer shown in FIG. 4 along a line B-B.

Embodiments of the present disclosure also provide a flexible touch display device, which can be folded or bent. As shown in FIG. 2, the flexible touch display device may include a flexible touch display panel 2 and a flexible polarizer 1. A structure of the flexible polarizer 1 may refer to structures described in any of foregoing embodiments, which will not be repeated here.

As shown in FIG. 2, the flexible touch display panel 2 may include a touch function layer 20 and a display panel 21 located on a side of the touch function layer 20. The touch function layer 20 may be directly integrated on the display panel 21, and may also be externally placed on the display panel 21 through sticking. The flexible polarizer 1 mentioned before may be located on a side of the touch function layer 20 away from the display panel 21, and the block layer 11 of the flexible polarizer 1 is attached to the touch function layer 20. Specifically, when the flexible polarizer 1 according to embodiments of the present disclosure includes aforementioned second bonding layer 15 which is attached to a side of the block layer 11 away from the linear polarizer layer 10, the block layer 11 of the flexible polarizer 1 may be bonded to the touch function layer 20 through the second bonding layer 15.

In some embodiments of the present disclosure, as shown in FIG. 3 to FIG. 6, the touch function layer 20 may include a buffer layer 201, a first metal pattern layer, an insulating layer 203, a second metal pattern layer and a protection layer 207.

The buffer layer 201 may be formed on the display panel 21. For example, a material of the buffer layer 201 may be an inorganic insulating material, such as silicon oxide, silicon nitride, etc., but not limited to this, depending on specific situations. It should be noted that, the inorganic insulating material may be deposited on the display panel 21 through a process such as chemical vapor deposition (CVD).

The first metal pattern layer may be formed on a side of the buffer layer 201 away from the display panel 21. The first metal pattern layer includes a plurality of first conductive bridges 202 that are disconnected from each other. For example, the metal material is formed on the buffer layer 201 by means of deposition or magnetron sputtering, to form a metal thin film. Then a process such as etching is performed on the metal thin film to form the first metal pattern layer. It should be noted that the metal material may be silver, copper, etc., so that the first metal pattern layer has good electrical conductivity.

The insulating layer 203 may cover the first metal pattern layer. The insulating layer 203 is provided with a plurality of hollowed-out holes 203*a*, and through the hollowed-out holes 203*a*, part of the first conductive bridge 202 is exposed. For example, a material of the insulating layer 203 may be an inorganic insulating material, such as silicon oxide, silicon nitride, etc., but not limited to this, depending on specific situations. It should be noted that the inorganic insulating material may be deposited on the first metal pattern layer and the buffer layer 201 through a process such as chemical vapor deposition (CVD), to form the insulating layer 203 covering the first metal pattern layer. Then a process such as etching is performed on the insulating layer 203 to form the plurality of hollowed-out holes 203*a*. The hollowed-out holes 203*a* may correspond to part of the first conductive bridge 202. That is, part of the first conductive bridge 202 is exposed through the hollowed-out holes 203*a*.

The second metal pattern layer may be formed on a side of the insulating layer 203 away from the buffer layer 201. The second metal pattern layer includes a first touch electrode 204 and a second touch electrode 205 which are arranged in the same layer and are insulated from each other. A plurality of first touch electrodes 204 are provided. As shown in FIG. 3 to FIG. 6, adjacent first touch electrodes 204 are electrically connected to the same first conductive bridge 202 respectively via hollowed-out holes 203*a*. A plurality of second touch electrodes 205 are provided. Adjacent second touch electrodes 205 are electrically connected through a second conductive bridge 206. The second conductive bridge 206 is arranged in the same layer as the first touch electrode 204 and the second touch electrode 205. It should be noted that one of the touch electrode 204 and the second touch electrode 205 is a transmitting (TX) electrode, and the other is a receiving (RX) electrode. For example, a metal material may be formed on the insulating layer 203 by means of deposition or magnetron sputtering, to form a metal thin film. Then a process such as etching is performed on the metal thin film to form the second metal pattern layer mentioned before. It should be noted that the metal material may be silver, copper, etc., so that the second metal pattern layer has good electrical conductivity.

Figure 6:
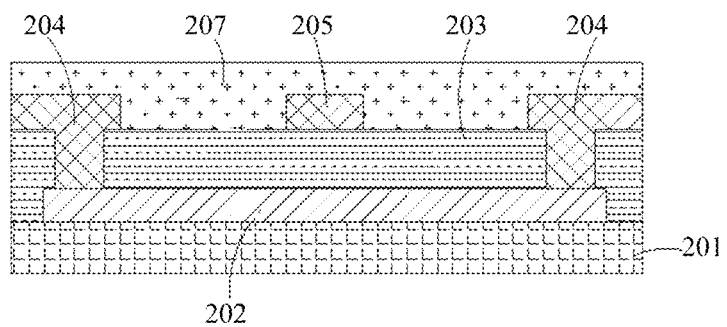
FIG. 6 illustrates a partial cross-sectional schematic diagram of a touch function layer according to another embodiment of the present disclosure.

As shown in FIG. 6 the protection layer 207 may cover the second metal pattern layer, and a side of the protection layer 207 away from the second metal layer is bonded to the block layer 11 through the second bonding layer 15. For example, a material of the protection layer 207 may be an organic material, for example, a material such as PI (Polyimide), etc., or may be an inorganic material, for example, a material such as silicon oxide, silicon nitride, etc.

In some embodiments of the present disclosure, orthographic projections of the first touch electrode 204 and the second touch electrode 205 on the buffer layer 201 are both mesh-shaped. That is, the first touch electrode 204 and the second touch electrode 205 can be metal mesh electrodes. As a result, display would not be affected, and also the internal stress of the touch electrodes can be better released during bending of the touch function layer 20, so as to avoid the breakage of the touch electrodes thereby ensuring the stability performance of the touch. In addition, the flexibility of the touch function layer 20 can be easily improved, so that the flexibility of the entire flexible touch display panel 2 can be improved. As a result, the flexible touch display panel 2 can have a good bending ability, so that the flexible touch display panel 2 can be easily used in a flexible touch display device with a large bending angle, thereby expanding an application range of the flexible touch display panel 2.

It should be understood that orthographic projections of the first conductive bridge 202 and the second conductive bridge 206 on the buffer layer 201 can also be mesh-shaped.

Figure 7:
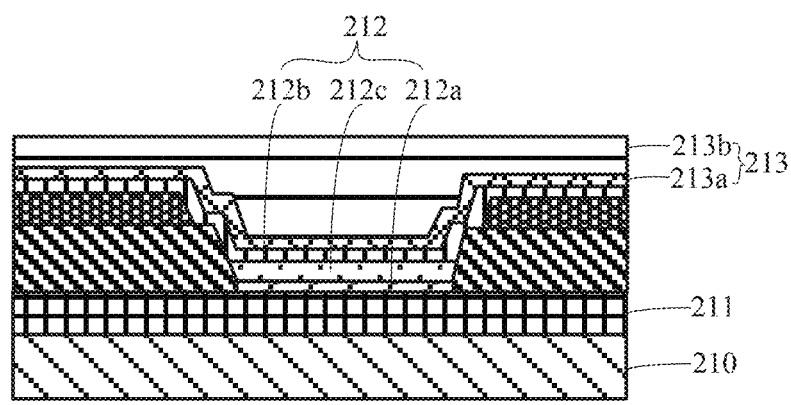
FIG. 7 illustrates a partial cross-sectional schematic diagram of display function of the flexible touch display panel in the flexible touch display device according to an embodiment of the present disclosure.

For example, the display panel 21 according to embodiments of the present disclosure may be an OLED display panel. As shown in FIG. 7 the display panel 21 may include a base layer 210, a driving circuit layer 211, an organic light-emitting display layer 212, and a thin film encapsulation layer 213.

The base layer 210 can be a single-layer structure or a composite multi-layer structure. For example, the base layer 210 can be a flexible base layer, and can be made of PI material, etc., but not limited to this. The base layer 210 can also be made of other materials, depending on specific situations.

The driving circuit layer 211 may be formed on the base layer 210. The driving circuit layer 211 may include a transistor, a storage capacitor, a signal line, a switching line, a pad, etc.

The organic light-emitting display layer 212 may be formed on a side of the driving circuit layer 211 away from the base layer 210. The organic light-emitting display layer 212 may include a plurality of OLED devices. As shown in FIG. 7, the OLED devices may include an anode 212a, a cathode 212b and an organic light-emitting layer 212c located between the anode 212a and the cathode 212b.

The thin film encapsulation layer 213 can be formed on a side of the organic light-emitting display layer 212 away from the base layer 210, and the touch function layer 20 is formed on a side of the thin film encapsulation layer 213 away from the organic light-emitting display layer 212. For example, the thin film encapsulation layer 213 according to embodiments of the present disclosure may include multiple layers of materials. For example, as shown in FIG. 7, the thin film encapsulation layer 213 may include an inorganic encapsulation layer 213a and an organic encapsulation layer 213b. A material of the inorganic encapsulation layer 213a may include silicon oxide, silicon nitride, etc., but not limited to this, depending on specific situations. The inorganic encapsulation layer 213a may be formed through a process such as CVD (chemical vapor deposition). The organic encapsulation layer 213b may be formed through an IJP (ink jet printing) process. It should be noted that, the inorganic encapsulation layer 213a and the organic encapsulation layer 213b may be provided with multiple layers, and the inorganic encapsulation layer 213a and the organic encapsulation layer 213b may be arranged alternately.

In some embodiments of the present disclosure, as shown in FIG. 2, the flexible touch display device may further include a cover plate 3, a third bonding layer 4 and a back film 5.

The cover plate 3 may be bonded to a side of the flexible polarizer 1 away from the touch function layer 20 through the third bonding layer 4. The cover plate 3 may be a flexible cover plate 3, for example, the cover plate 3 may be made of PI (Polyimide) and other materials.

A material of the third bonding layer 4 may include polymethyl methacrylate. That is, the third bonding layer 4 may be acrylic glue, so as to ensure the bonding stability between the cover plate 3 and the flexible polarizer 1, and also to protect the flexible polarizer 1, but not limited to this. The material of the third bonding layer 4 may also be other materials. A thickness of the third bonding layer 4 may range from 0.1 μm to 3 μm, for example, 0.1 μm, 1 μm, 2 μm, 3 μm, etc., but not limited to this. The thickness of the third bonding layer 4 may also be within other ranges, such as less than 0.1 μm or greater than 3 μm, etc., depending on specific situations.

The back film 5 is arranged on a side of the display panel 21 away from the touch function layer 20. The back film 5 has some flexibility, and can also support the flexible touch display panel 2, to improve an ability of the flexible touch display panel 2 to restore deformation. For example, the back film 5 can be made of metal material, but not limited to this. The back film 5 can also be made of other materials.

In some embodiments of the present disclosure, a specific type of the flexible touch display device is not particularly limited. Any type of flexible touch display device commonly used in the art can be used, for example, televisions, mobile phones, computers, watches, in-vehicle equipment, medical equipment, etc. Those skilled in the art may select correspondingly according to the specific application of the flexible touch display device, which will not be repeated here.

It should be noted that, in addition to the flexible touch display panel 2, the flexible polarizer 1, the cover plate 3, and the back film 5, the flexible touch display device further includes other necessary parts and components. Take a mobile phone as an example, such as a casing, a circuit board, a power cord, etc. Those skilled in the art can supplement other parts and components accordingly according to specific usage requirements of the flexible touch display device, which will not be repeated here.

Other embodiments of the present disclosure will readily occur to those skilled in the art upon consideration of the specification and practice of what is disclosed herein. The present disclosure is intended to cover any variations, uses, or adaptations of the disclosure that follow the general principles of the present disclosure and include common general knowledge or techniques in the technical field not disclosed in the present disclosure. The specification and examples are to be regarded as exemplary only, and the true scope and spirit of the present disclosure are indicated by the appended claims.

What is claimed is:

1. A flexible polarizer, applied in a flexible touch display device, comprising:
   a support protection layer;
   a linear polarized layer arranged on a side of the support protection layer, wherein the linear polarized layer comprises an acidic substance;
   a retardation layer arranged on a side of the linear polarized layer away from the support protection layer, and is bonded to the linear polarized layer through a first bonding layer; and
   a block layer arranged on a side of the retardation layer away from the linear polarized layer, wherein a second bonding layer is provided on a side of the block layer away from the retardation layer, and the block layer is bonded to a flexible touch display panel in the flexible touch display device through the second bonding layer;
   wherein the block layer is configured to block the acidic substance in the linear polarized layer from penetrating into the flexible touch display panel.

2. The flexible polarizer according to claim 1, wherein the linear polarized layer is an iodine-based polarized layer, and the acidic substance comprises iodine element.

3. The flexible polarizer according to claim 2, wherein a material of the block layer comprises polymethyl methacrylate or cycloolefin polymer.

4. The flexible polarizer according to claim 3, wherein a thickness of the block layer ranges from 0.5 μm to 2 μm.

5. The flexible polarizer according to claim 3, wherein light transmittance of the block layer is greater than 90%.

6. The flexible polarizer according to claim 2, wherein a thickness of the linear polarized layer ranges from 1 μm to 15 μm.

7. The flexible polarizer according to claim 1, wherein a material of the support protection layer comprises polymethyl methacrylate, and a thickness of the support protection layer ranges from 10 μm to 50 μm.

8. The flexible polarizer according to claim 1, wherein materials of the first bonding layer and the second bonding layer comprise polymethyl methacrylate, and thicknesses of the first bonding layer and the second bonding layer range from 0.1 μm to 3 μm.

9. The flexible polarizer according to claim 1, wherein a thickness of the retardation layer ranges from 0.1 μm to 5 μm.

10. The flexible polarizer according to claim 1, wherein elastic modulus of the flexible polarizer ranges from 1 GPa to 10 GPa.

11. A flexible touch display device, comprising:
a flexible touch display panel comprising a touch function layer and a display panel arranged on a side of the touch function layer; and
a flexible polarizer comprising:
a support protection layer;
a linear polarized layer arranged on a side of the support protection layer, wherein the linear polarized layer comprises an acidic substance;
a retardation layer arranged on a side of the linear polarized layer away from the support protection layer, and is bonded to the linear polarized layer through a first bonding layer; and
a block layer arranged on a side of the retardation layer away from the linear polarized layer, wherein a second bonding layer is provided on a side of the block layer away from the retardation layer, and the block layer is bonded to a flexible touch display panel in the flexible touch display device through the second bonding layer;
wherein the block layer is configured to block the acidic substance in the linear polarized layer from penetrating into the flexible touch display panel;
wherein the flexible polarizer is arranged on a side of the touch function layer away from the display panel, and the flexible polarizer is bonded to the touch function layer through the second bonding layer.

12. The flexible touch display device according to claim 11, wherein the touch function layer comprises:
a buffer layer formed on the display panel;
a first metal pattern layer formed on a side of the buffer layer away from the display panel, wherein the first metal pattern layer comprises a plurality of first conductive bridges disconnected from each other;
an insulating layer covering the first metal pattern layer, wherein the insulating layer is provided with a plurality of hollowed-out holes, and the hollowed-out holes expose part of the first conductive bridge;
a second metal pattern layer formed on a side of the insulating layer away from the buffer layer, wherein the second metal pattern layer comprises a first touch electrode and a second touch electrode that are arranged in the same layer and are insulated from each other, and wherein a plurality of first touch electrodes are provided, and adjacent first touch electrodes are electrically connected to the same first conductive bridge via the hollowed-out holes, respectively; a plurality of second touch electrodes are provided, and adjacent second touch electrodes are electrically connected through a second conductive bridge; and the second conductive bridge is arranged in the same layer as the first touch electrode and the second touch electrode; and
a protection layer covering the second metal pattern layer, wherein a side of the protection layer away from the second metal pattern layer is bonded to the block layer through the second bonding layer.

13. The flexible touch display device according to claim 12, wherein orthographic projections of the first touch electrode and the second touch electrode on the buffer layer are both mesh-shaped.

14. The flexible touch display device according to claim 11, wherein the display panel comprises:
a base layer;
a driving circuit layer formed on the base layer;
an organic light-emitting display layer formed on a side of the driving circuit layer away from the base layer; and
a thin film encapsulation layer formed on a side of the organic light-emitting display layer away from the base layer, wherein the touch function layer is formed on a side of the thin film encapsulation layer away from the organic light-emitting display layer.

15. The flexible touch display device according to claim 11, further comprising a cover plate, a third bonding layer and a back film;
wherein the cover plate is bonded to a side of the flexible polarizer away from the touch function layer through the third bonding layer, and the back film is arranged on a side of the display panel away from the touch function layer.

16. The flexible touch display device according to claim 11, wherein the linear polarized layer is an iodine-based polarized layer, and the acidic substance comprises iodine element.

17. The flexible touch display device according to claim 16, wherein a material of the block layer comprises polymethyl methacrylate or cycloolefin polymer.

18. The flexible touch display device according to claim 17, wherein a thickness of the block layer ranges from 0.5 μm to 2 μm.

19. The flexible touch display device according to claim 17, wherein light transmittance of the block layer is greater than 90%.

20. The flexible touch display device according to claim 16, wherein a thickness of the linear polarized layer ranges from 1 μm to 15 μm.

* * * * *